United States Patent
Hijikata et al.

[11] Patent Number: 6,129,859
[45] Date of Patent: *Oct. 10, 2000

[54] ANTIFERROELECTRIC LIQUID CRYSTAL COMPOSITION

[75] Inventors: Yoshimasa Hijikata; Katsuhide Kikuchi; Hitoshi Hayashi, all of Nishio, Japan

[73] Assignee: Nippon Soken, Inc., Aichi, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/900,137

[22] Filed: Jul. 25, 1997

[30] Foreign Application Priority Data

Jul. 25, 1996 [JP] Japan ................................. 8-196429

[51] Int. Cl.$^7$ ............................ C09K 19/12; C09K 19/20
[52] U.S. Cl. ............................... 252/299.65; 252/299.64; 252/299.67
[58] Field of Search .................. 252/299.64, 299.65, 252/299.67

[56] References Cited

U.S. PATENT DOCUMENTS

| 4,576,732 | 3/1986 | Isogai ................................. 252/299.65 |
| 4,754,051 | 6/1988 | Sasaki et al. ............................. 560/8 |

(List continued on next page.)

FOREIGN PATENT DOCUMENTS

| 0 330 491 A2 | 6/1989 | European Pat. Off. . |
| 0 339 987 A2 | 11/1989 | European Pat. Off. . |
| 0 517 504 A1 | 12/1992 | European Pat. Off. . |
| 0517504A1 | 12/1992 | European Pat. Off. . |
| 0 525 737 A1 | 2/1993 | European Pat. Off. . |

(List continued on next page.)

OTHER PUBLICATIONS

Nishiyama et al., "Effect of Size of the Lateral Substituent at the Chiral Centre on the Stability of Some Chiral Smectic Liquid–crystalline Phases" Journal of Materials Chemistry 3 (1993) No. 2, Cambridge, GB, pp. 149–159.

(List continued on next page.)

*Primary Examiner*—C. H. Kelly
*Attorney, Agent, or Firm*—Pillsbury Madison & Sutro

[57] ABSTRACT

The present invention discloses an antiferroelectric liquid crystal composition respectively containing the compounds of formula (1), (2), (3) or (4), wherein $R_1$, $R_3$, $R_5$ and $R_7$ are alkyl groups having 7–13 carbon atoms, $R_2$, $R_4$, $R_6$ and $R_8$ are alkyl groups having 4–8 carbon atoms, any of the four hydrogen atoms in each of the phenyl groups of the formulas may be substituted with a halogen atom such as F, Cl or Br, or a $CH_3$ group, and X indicates —O— or —.

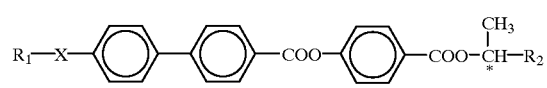

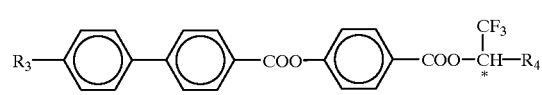

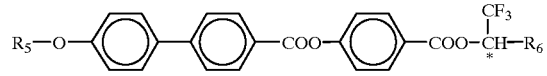

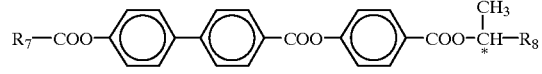

8 Claims, 1 Drawing Sheet

U.S. PATENT DOCUMENTS

| | | | |
|---|---|---|---|
| 4,780,242 | 10/1988 | Miyazawa et al. | 252/299.65 |
| 4,921,632 | 5/1990 | Nakamura et al. | 252/299.1 |
| 4,961,874 | 10/1990 | Takeuchi et al. | 252/299.6 |
| 5,046,823 | 9/1991 | Mori et al. | 359/56 |
| 5,110,498 | 5/1992 | Suzuki et al. | 252/299.66 |
| 5,116,531 | 5/1992 | Hagiwara | 252/299.65 |
| 5,151,213 | 9/1992 | Reiffenrath et al. | 252/299.6 |
| 5,171,471 | 12/1992 | Suzuki et al. | 151/199.61 |
| 5,184,847 | 2/1993 | Suzuki et al. | 252/299.65 |
| 5,204,020 | 4/1993 | Suzuki | 252/299.67 |
| 5,207,947 | 5/1993 | Suzuki et al. | 252/299.67 |
| 5,262,086 | 11/1993 | Suzuki et al. | 252/299.65 |
| 5,264,150 | 11/1993 | Yui et al. | 252/299.64 |
| 5,316,694 | 5/1994 | Murashiro et al. | 252/299.61 |
| 5,330,678 | 7/1994 | Okabe et al. | 252/299.62 |
| 5,344,586 | 9/1994 | Suzuki et al. | 252/299.64 |
| 5,352,382 | 10/1994 | Johno et al. | 252/299.65 |
| 5,356,562 | 10/1994 | Greenfield et al. | 252/299.63 |
| 5,364,560 | 11/1994 | Isozaki et al. | 252/299.65 |
| 5,364,561 | 11/1994 | Isozaki et al. | 252/299.65 |
| 5,374,375 | 12/1994 | Yui et al. | 252/299.65 |
| 5,378,392 | 1/1995 | Murashiro et al. | 252/299.01 |
| 5,378,396 | 1/1995 | Yui et al. | 252/299.65 |
| 5,393,460 | 2/1995 | Okabe et al. | 252/299.65 |
| 5,417,885 | 5/1995 | Suzuki et al. | 252/299.65 |
| 5,424,005 | 6/1995 | Suzuki et al. | 252/299.65 |
| 5,433,887 | 7/1995 | Isozaki et al. | 252/299.64 |
| 5,534,190 | 7/1996 | Johno et al. | 252/299.65 |
| 5,676,881 | 10/1997 | Takigawa et al. | 252/299.67 |
| 5,700,392 | 12/1997 | Kikuchi et al. | 252/299.01 |
| 5,705,094 | 1/1998 | Takeuchi et al. | 252/299.01 |

FOREIGN PATENT DOCUMENTS

| | | |
|---|---|---|
| 0525737A1 | 2/1993 | European Pat. Off. . |
| 0 562 627 A1 | 9/1993 | European Pat. Off. . |
| 0562627A1 | 9/1993 | European Pat. Off. . |
| 0 582 468 A1 | 2/1994 | European Pat. Off. . |
| 0 582 519 A1 | 2/1994 | European Pat. Off. . |
| 0582519A1 | 2/1994 | European Pat. Off. . |
| 1-139551 | 6/1989 | Japan . |
| 1-213390 | 8/1989 | Japan . |
| 1-316339 | 12/1989 | Japan . |
| 1-316367 | 12/1989 | Japan . |
| 2-028128 | 1/1990 | Japan . |
| 2-069440 | 3/1990 | Japan . |
| 2-275839 | 11/1990 | Japan . |
| 3-5441 | 1/1991 | Japan . |
| 3-83951 | 4/1991 | Japan . |
| 3-123759 | 5/1991 | Japan . |
| 3-292388 | 12/1991 | Japan . |
| 5-65486 | 3/1993 | Japan . |
| 5-230032 | 9/1993 | Japan . |

OTHER PUBLICATIONS

Database WPI/Derwent Publications Ltd., London, GB, Sep. 1994 re JP–A–06–271,852.

Nishiyama et al: "Effect of Size of the Lateral Substituent at the Chiral Centre on the Stability of some Chiral Smectic Liquid–crystalline Phases", Journal of Materials Chemistry, vol. 3, No. 2, 1993, pp. 149–159.

Suzuki et al: "New Fluorine–containing Ferroelectric Liquid Crystal Compounds Showing Tristable Switching", Liquid Crystals, 1989, vol. 6, No. 2, pp. 167–174.

Chandani, et al: "Tristable Switching in Surface Stabilized Ferroelectric Liquid Crystals with a Large Spontaneous Polarization", Jap. Journal of Applied Physics, vol. 27, No. 5, May 1988, pp. L729–L932.

Meyer: "Ferroelectric Liquid Crystals; a Review", Mol-cryst.Liq.Cryst., 1977, vol. 40, pp. 33–48.

Fig. 1
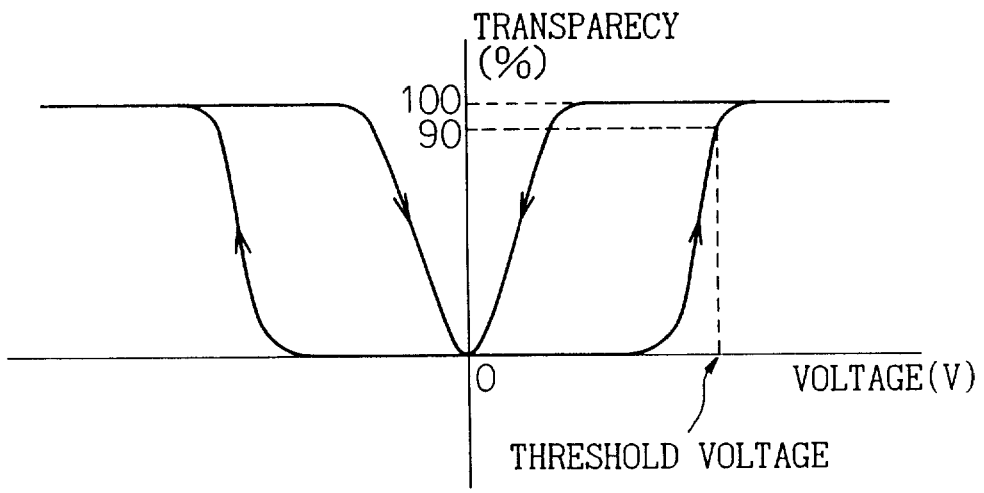
Fig. 2A
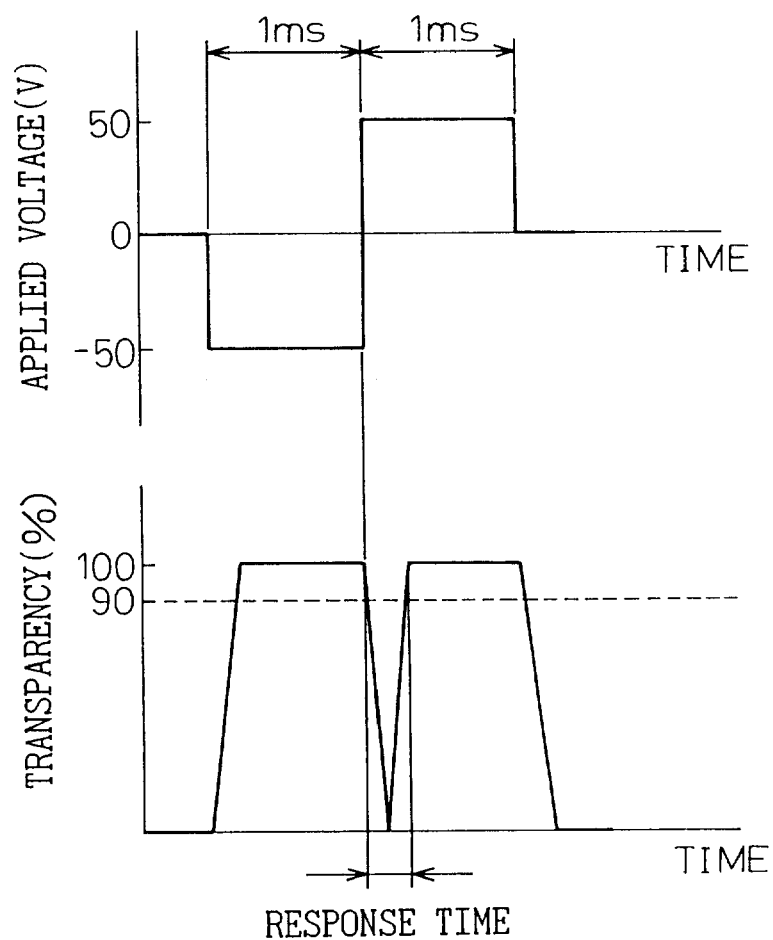
Fig. 2B

ANTIFERROELECTRIC LIQUID CRYSTAL COMPOSITION

BACKGROUND OF THE INVENTION

1. Field of the Invention

The present invention relates to an antiferroelectric liquid crystal composition suitable for use in liquid crystal display elements that utilize the response of antiferroelectric liquid crystal to an electric field.

2. Description of the Related Art

Recently, liquid crystal displays have become useful as display elements in a wide range of applications which take advantage of their characteristics such as thin form, light weight and low power consumption. The majority of these display devices are typically of the TN (twisted nematic) type that use nematic liquid crystal. Since the driving of this TN type of display is based on the anisotropy of the relative dielectric constant of the liquid crystal, its response speed is slow thereby resulting in a need for improvement.

In contrast, liquid crystal devices using chiralsmectic C ($S_C^*$) liquid crystal, which were discovered by Meyer, et al., exhibit ferroelectric properties, have high-speed response and memory capabilities which cannot be achieved by nematic liquid crystals. Research has been conducted to apply this liquid crystal to ferroelectric liquid crystal displays by taking advantage of these characteristics. It has been difficult, however, to realize the favorable orientation and memory capabilities offered by this display method in actual cells. There are also numerous problems yet to be solved, including the problem of susceptibility to external shock.

On the other hand, an antiferroelectric phase ($S_{CA}^*$ phase), discovered by Chandani, et al., exhibits three stable states on the low temperature side of the above-mentioned $S_C^*$ phase. This antiferroelectric liquid crystal exhibits a thermodynamically stable phase in which dipoles are arranged in antiparallel fashion for each adjacent layer. It causes a magnetic field-induced phase shift between the antiferroelectric phase and ferroelectric phase that is characterized by a well-defined threshold value relative to the applied voltage and double hysteresis properties. Studies are being conducted on a novel display method that uses this switching behavior.

In the case of applying an antiferroelectric liquid crystal to display elements, conventionally known ferroelectric liquid crystal materials cannot always be said to be preferable in terms of the liquid crystal temperature range over which a ferroelectric phase is demonstrated, the threshold voltage for driving, display performance and so forth. In consideration of these circumstances, the object of the present invention is to provide an antiferroelectric liquid crystal composition having an improved liquid crystal temperature range, threshold voltage and display performance.

SUMMARY OF THE INVENTION

The present invention discloses an antiferroelectric liquid crystal composition containing at least one type of compound of the antiferroelectric liquid crystal compounds represented by general formula (1); at least one type of compound of the antiferroelectric liquid crystal compounds represented by general formula (2); and, at least one type of compound of the antiferroelectric liquid crystal compounds represented by general formulas (3) and (4):

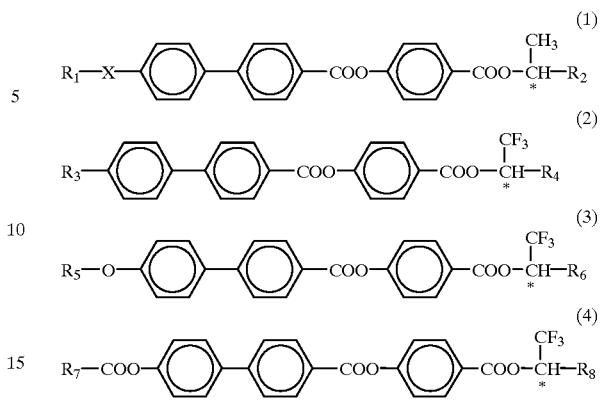

wherein, $R_1$, $R_3$, $R_5$ and $R_7$ are alkyl groups having 7–13 carbon atoms, $R_2$, $R_4$, $R_6$ and $R_8$ are alkyl groups having 4–8 carbon atoms, any of the four hydrogen atoms in each of the phenyl groups of the formulas may be substituted with a halogen atom such as F, Cl or Br, or a $CH_3$ group, and X indicates —O— or —.

These ferroelectric liquid crystal compounds can be prepared according to the methods described in Japanese Unexamined Patent Publication No. 3-292388 and Japanese Unexamined Patent Publication No. 5-230032, or by combining known unit reactions of organic synthesis with the methods described in these publications.

In addition, the present invention also provides a liquid crystal composition that contains at least one type of the antiferroelectric liquid crystal compounds represented by general formula (1), and at least one type of compound of the antiferroelectric compounds represented by general formula (5):

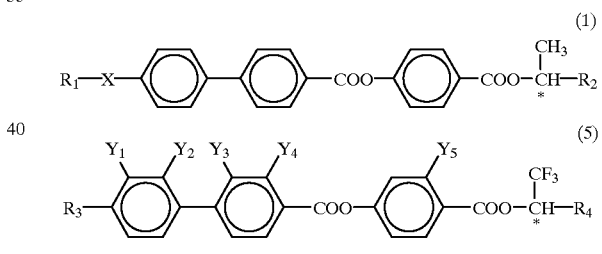

wherein, $R_1$ and $R_3$ are alkyl groups having 7–13 carbon atoms, $R_2$ and $R_4$ are alkyl groups having 4–8 carbon atoms, any of the four hydrogen atoms in each of the phenyl groups of formulas (1) through (3) may be substituted with a halogen atom such as F, Cl or Br, or a $CH_3$ group, provided that, in the case all 12 of the three groups of four hydrogen atoms each in the phenyl groups of general formula (1) are hydrogen atoms, at least one of $Y_1$ through $Y_5$ in general formula (5) is substituted with a halogen atom such as F, Cl or Br, or a $CH_3$ group; and, X indicates —O— or —.

Known examples of these ferroelectric liquid crystal substances are described in Japanese Unexamined Patent Publication No. 1-213390, Japanese Unexamined Patent Publication No. 2-275839, Japanese Unexamined Patent Publication No. 3-5441, Japanese Unexamined Patent Publication No. 3-83951, Japanese Unexamined Patent Publication No. 3-123759 and Japanese Unexamined Patent Publication No. 6-198388.

BRIEF DESCRIPTION OF THE DRAWINGS

FIG. 1 is a double hysteresis curve showing the transmitted light intensity of a liquid crystal composition relative to changes in voltage.

FIGS. 2A and 2B show the applied voltage for measuring the response characteristics of a ferroelectric liquid crystal display element.

DESCRIPTION OF THE PREFERRED EMBODIMENTS

The antiferroelectric liquid crystal compound represented by general formula (1) can be at least one type of compound of the group consisting of the compounds indicated in general formulas (1-1) through (1-10) below

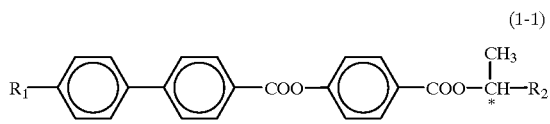
(1-1)

wherein, $R_1$ is selected from alkyl groups having 8, 9, 10, 11 or 12 carbon atoms, and $R_2$ is selected from alkyl groups having 4, 5, 6 or 8 carbon atoms;

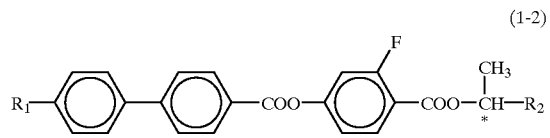
(1-2)

wherein, $R_1$ is selected from alkyl groups having 8, 9, 10, 11 or 12 carbon atoms, and $R_2$ is selected from alkyl groups having 4, 5, 6 or 8 carbon atoms;

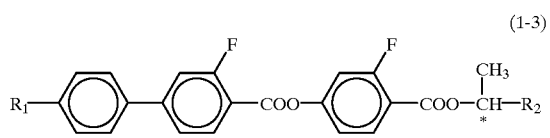
(1-3)

wherein, $R_1$ is selected from alkyl groups having 8, 9, 10, 11 or 12 carbon atoms, and $R_2$ is selected from alkyl groups having 4, 5, 6 or 8 carbon atoms;

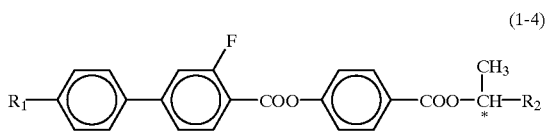
(1-4)

wherein, $R_1$ is selected from alkyl groups having 8, 9, 10, 11 or 12 carbon atoms, and $R_2$ is selected from alkyl groups having 4, 5, 6 or 8 carbon atoms;

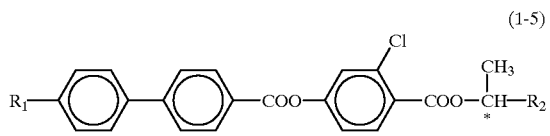
(1-5)

wherein, $R_1$ is selected from alkyl groups having 8, 9, 10, 11 or 12 carbon atoms, and $R_2$ is selected from alkyl groups having 4, 5, 6 or 8 carbon atoms;

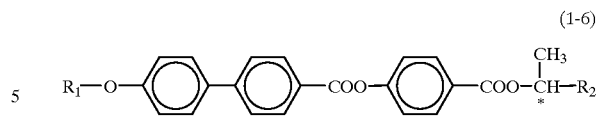
(1-6)

wherein, $R_1$ is selected from alkyl groups having 8, 9, 10, 11 or 12 carbon atoms, and $R_2$ is selected from alkyl groups having 4, 5, 6 or 8 carbon atoms;

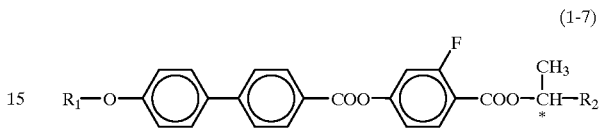
(1-7)

wherein, $R_1$ is selected from alkyl groups having 8, 9, 10, 11 or 12 carbon atoms, and $R_2$ is selected from alkyl groups having 4, 5, 6 or 8 carbon atoms;

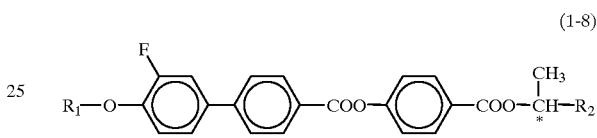
(1-8)

wherein, $R_1$ is selected from alkyl groups having 8, 9, 10, 11 or 12 carbon atoms, and $R_2$ is selected from alkyl groups having 4, 5, 6 or 8 carbon atoms;

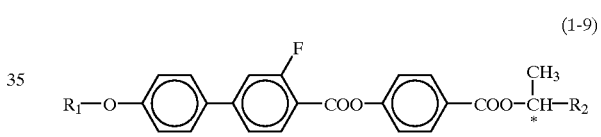
(1-9)

wherein, $R_1$ is selected from alkyl groups having 8, 9, 10, 11 or 12 carbon atoms, and $R_2$ is selected from alkyl groups having 4, 5, 6 or 8 carbon atoms;

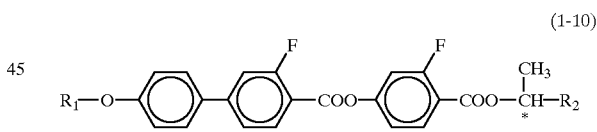
(1-10)

wherein, $R_1$ is selected from alkyl groups having 8, 9, 10, 11 or 12 carbon atoms), and $R_2$ is selected from alkyl groups having 4, 5, 6 or 8 carbon atoms.

In addition, the following compounds are also examples of an antiferroelectric liquid crystal compound included in general formula (1):

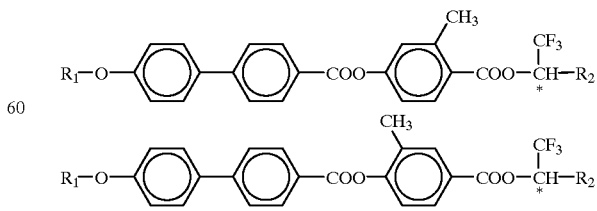

wherein, $R_1$ is an alkyl group having 4–16 carbon atoms, and $R_2$ is an alkyl group having 4–12 carbon atoms.

The antiferroelectric liquid crystal compound represented by general formula (2) can be at least one type of compound of the group consisting of compounds indicated by the general formulas (2-1) through (2-4) below:

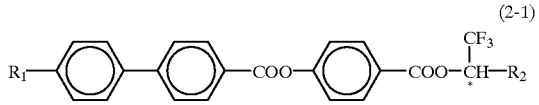
(2-1)

wherein, $R_1$ is selected from alkyl groups having 8, 9, 10, 11 or 12 carbon atoms, and $R_2$ is selected from alkyl groups having 4, 5, 6 or 8 carbon atoms;

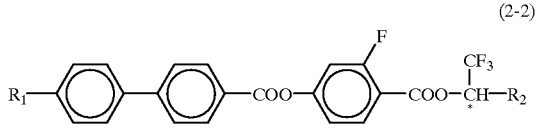
(2-2)

wherein, $R_1$ is selected from alkyl groups having 8, 9, 10, 11 or 12 carbon atoms, and $R_2$ is selected from alkyl groups having 4, 5, 6 or 8 carbon atoms;

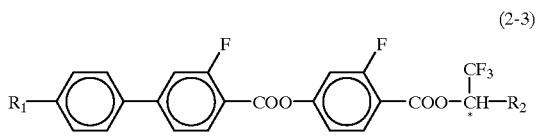
(2-3)

wherein, $R_1$ is selected from alkyl groups having 8, 9, 10, 11 or 12 carbon atoms, and $R_2$ is selected from alkyl groups having 4, 5, 6 or 8 carbon atoms;

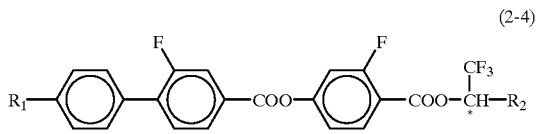
(2-4)

wherein, $R_1$ is selected from alkyl groups having 8, 9, 10, 11 or 12 carbon atoms, and $R_2$ is selected from alkyl groups having 4, 5, 6 or 8 carbon atoms.

The antiferroelectric liquid crystal compound represented by general formula (3) can be at least one type of compound of the group consisting of the compounds indicated by general formulas (3-1) through (3-6) below:

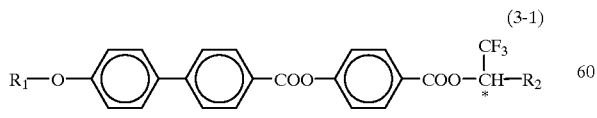
(3-1)

wherein, $R_1$ is selected from alkyl groups having 8, 9, 10, 11 or 12 carbon atoms, and $R_2$ is selected from alkyl groups having 4, 5, 6 or 8 carbon atoms;

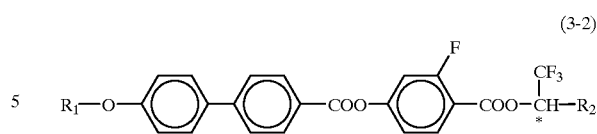
(3-2)

wherein, $R_1$ is selected from alkyl groups having 8, 9, 10, 11 or 12 carbon atoms, and $R_2$ is selected from alkyl groups having 4, 5, 6 or 8 carbon atoms;

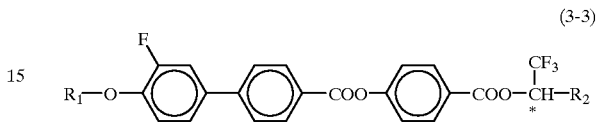
(3-3)

wherein, $R_1$ is selected from alkyl groups having 8, 9, 10, 11 or 12 carbon atoms, and $R_2$ is selected from alkyl groups having 4, 5, 6 or 8 carbon atoms;

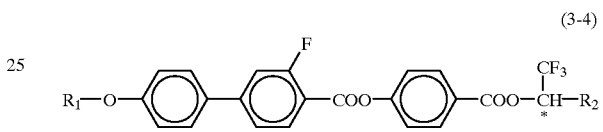
(3-4)

wherein, $R_1$ is selected from alkyl groups having 8, 9, 10, 11 or 12 carbon atoms, and $R_2$ is selected from alkyl groups having 4, 5, 6 or 8 carbon atoms;

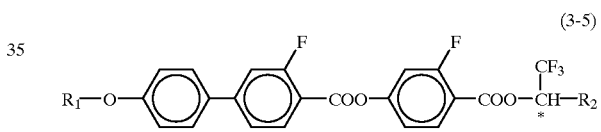
(3-5)

wherein, $R_1$ is selected from alkyl groups having 8, 9, 10, 11 or 12 carbon atoms, and $R_2$ is selected from alkyl groups having 4, 5, 6 or 8 carbon atoms;

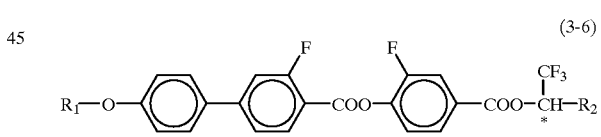
(3-6)

wherein, $R_1$ is selected from alkyl groups having 8, 9, 10, 11 or 12 carbon atoms), and $R_2$ is selected from alkyl groups having 4, 5, 6 or 8 carbon atoms.

The antiferroelectric liquid crystal compound represented by general formula (4) can be at least one type of compound of the group consisting of compounds indicated by general formulas (4-1) through (4-4) below:

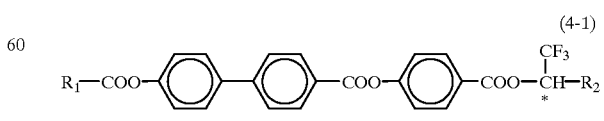
(4-1)

wherein, $R_1$ is selected from alkyl groups having 8, 9, 10, 11 or 12 carbon atoms, and $R_2$ is selected from alkyl groups having 4, 5, 6 or 8 carbon atoms;

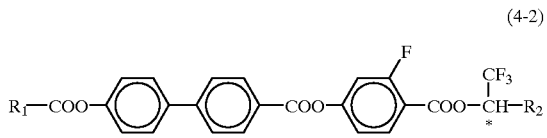

(4-2)

wherein, $R_1$ is selected from alkyl groups having 8, 9, 10, 11 or 12 carbon atoms, and $R_2$ is selected from alkyl groups having 4, 5, 6 or 8 carbon atoms;

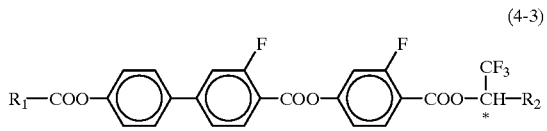

(4-3)

wherein, $R_1$ is selected from alkyl groups having 8, 9, 10, 11 or 12 carbon atoms, and $R_2$ is selected from alkyl groups having 4, 5, 6 or 8 carbon atoms;

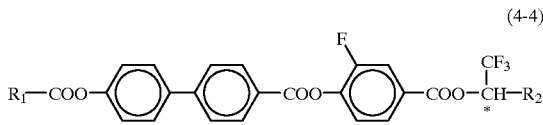

(4-4)

wherein, $R_1$ is selected from alkyl groups having 8, 9, 10, 11 or 12 carbon atoms, and $R_2$ is selected from alkyl groups having 4, 5, 6 or 8 carbon atoms.

The antiferroelectric liquid crystal compound can be an antiferroelectric liquid crystal compound that includes at least one type of compound selected from each of the compounds represented by general formulas (1), (2), (3) and (4).

The antiferroelectric liquid crystal compound represented by general formula (5) can be at least one type of compound of the group consisting of compounds indicated by general formula (5-1) through (5-4) below; provided that, in the case of containing the compounds indicated by the general formulas (1-1) and (1-6), at least one type of the compounds indicated by the general formulas (5-2) through (5-4) is contained.

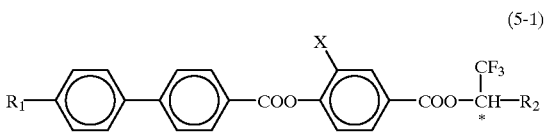

(5-1)

wherein, $R_1$ is selected from alkyl groups having 8, 9, 10, 11 or 12 carbon atoms, and $R_2$ is selected from alkyl groups having 4, 5, 6 or 8 carbon atoms;

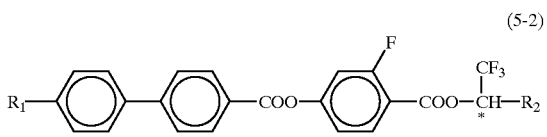

(5-2)

wherein, $R_1$ is selected from alkyl groups having 8, 9, 10, 11 or 12 carbon atoms, and $R_2$ is selected from alkyl groups having 4, 5, 6 or 8 carbon atoms;

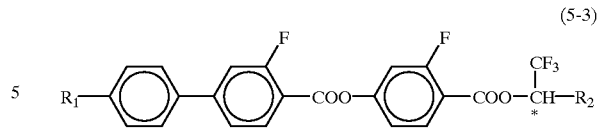

(5-3)

wherein, $R_1$ is selected from alkyl groups having 8, 9, 10, 11 or 12 carbon atoms, and $R_2$ is selected from alkyl groups having 4, 5, 6 or 8 carbon atoms;

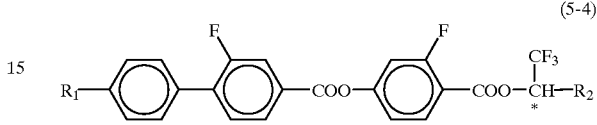

(5-4)

wherein, $R_1$ is selected from alkyl groups having 8, 9, 10, 11 or 12 carbon atoms, and $R_2$ is selected from alkyl groups having 4, 5, 6 or 8 carbon atoms.

EXAMPLES

Although the following provides a detailed explanation of the present invention through its examples, the present invention is not limited to these examples.

Example 1

The liquid crystal compositions A, B, C and D having the compositions shown in Table 2 were prepared using compounds no. 1 through 6 shown in Table 1.

A: Liquid crystal composition composed entirely of the antiferroelectric liquid crystal compounds represented by general formula (1)

B: Liquid crystal composition composed entirely of the antiferroelectric liquid crystal compounds represented by general formula (2)

C: Liquid crystal composition composed entirely of the antiferroelectric liquid crystal compounds represented by general formula (3)

D: Antiferroelectric liquid crystal compound composed of the antiferroelectric liquid crystal compounds represented by general formulas (1), (2) and (3).

The liquid crystal compositions were each injected into a cell in which two sheets of glass were superimposed while maintaining a gap of 2 µm, said sheets of glass having transparent electrodes and polyimide aligning films arranged on their surfaces and on which aligning treatment was performed by rubbing. Following injection, the cell was heated to a temperature at which the liquid crystal composition changes to an isotropic liquid followed by cooling to room temperature at the rate of 2° C./min to obtain antiferroelectric liquid crystal elements. A chopping wave of 1 Hz and ±25 V/µm was applied to this element after which the threshold voltage was determined by measuring the transmitted light intensity under a crossed nicol. Threshold voltage was defined as the voltage at which the transmission factor of the rise of the double hysteresis curve exceeds 90% as shown in FIG. 1.

The threshold voltages of compositions A, B, C and D at 50° C. were 31.1 V, 21.7 V, 41.0 V and 26.1 V, respectively.

The lower the threshold voltage the easier to drive the element as a display element and it must be less than 30 V. Since the threshold voltage of composition A composed entirely of the antiferroelectric liquid crystal compounds represented by general formula (1), and the threshold voltage of composition C composed entirely of the antiferroelectric liquid crystal compounds represented by general formula (3) are over 30 V, they have little practical application as is.

Next, although tilt angle, which has a significant effect on display characteristics, is typically referred to in antiferroelectric liquid crystal as the angle formed by molecules relative to the direction of normal of the molecular layer in a ferroelectric phase formed by electrical field induction, since it is difficult to measure this angle precisely, the inventors defined and measured tilt angle as the angle formed by a polarizer to the optical axis when a voltage greater than or equal to the threshold voltage is applied (completely bright state).

The tilt angles of compositions A, B, C and D were 24.8°, 29.4°, 32.4° and 29.4°.

The closer the tilt angle is to 45°, the more preferable the element for driving as a display element. In consideration of the required specifications of display characteristics in particular, it is preferable that the tilt angle be at least 28°. Since the tilt angle of composition A is less than 28°, it has little practical application as is.

In addition, the phase series of antiferroelectric liquid crystal compositions A, B, C and D are shown in Table 3. Since the temperature range of the $S_{CA}*$ phase limits the working temperature range in the case of using as a display element, a wide temperature range is preferable. In consideration of the environment in which display elements are used in particular, it is preferable that the upper limit temperature of the $S_{CA}*$ phase be at least 80° C. Since the upper limit of composition B composed entirely of the ferroelectric liquid crystal compounds represented by general formula (2) is 55.4° C., it has little practical application as is. However, composition D according to the present invention has a threshold voltage of 26.1 V, tilt angle of 29.4° and $S_{CA}*$ phase upper limit temperature of 81.1° C., thus exhibiting values that allow it to be used practically.

Moreover, the response time of the ferroelectric liquid crystal display element was measured based on the definition shown in FIGS. 2A and 2B by applying a voltage of electrical field strength ±50 V. The response time of composition D at 50° C. was 11.8 µs, exhibiting favorable characteristics.

Example 2

Liquid crystal compositions E and F having the compositions shown in Table 5 were prepared using compounds no. 7 and 8 shown in Table 4 and ferroelectric liquid crystal compositions A and B.

The tilt angles at 50° C. of composition E composed entirely of the antiferroelectric liquid crystal compounds represented by general formula (4) and composition F composed of the antiferroelectric liquid crystal compounds represented by general formulas (1), (2) and (4) were 32.5° and 29.1°, respectively, with both exhibiting favorable characteristics. The phase series of antiferroelectric liquid crystal compositions E and F are shown in Table 6. The upper limit temperatures of the $S_{CA}*$ phase of compositions E and F were 87.3° C. and 83.9° C., respectively, with both again exhibiting favorable properties. However, since the threshold voltage of composition E is 41.3 V which exceeds the value of 30 V, it has little practical application as is. Composition F according to the present invention has a threshold voltage of 25.4 V, tilt angle of 29.10, and $S_{CA}*$ phase upper limit temperature of 83.9° C., thus exhibiting values that enable it be used practically. In addition, the response time of composition F at 50° C. was 11.0 µs, indicating favorable characteristics.

Example 3

Liquid crystal composition G having the composition indicated in Table 7 was prepared using compounds no. 1 through 8 (antiferroelectric liquid crystal compositions A, B, C and E). Composition G according to the present invention had a threshold voltage of 28.1 V, tilt angle of 30.0° and $S_{CA}*$ phase upper limit temperature of 88.5° C., thus indicating values that enable it to be used practically (the phase series of antiferroelectric liquid crystal composition G is shown in Table 8). In addition, the response time of composition G at 50° C. was 11.8 µs, thus indicating favorable characteristics.

TABLE 1

Structural Formula

No. 1: (R) $C_8H_{17}$—O—⟨benzene⟩—⟨benzene⟩—COO—⟨benzene⟩—COO—CH($CH_3$)*—$C_6H_{13}$ No. 2: (R) $C_{11}H_{23}$—⟨benzene⟩—⟨benzene⟩—COO—⟨benzene-F⟩—COO—CH($CH_3$)*—$C_6H_{13}$ No. 3: (R) $C_{10}H_{21}$—⟨benzene⟩—⟨benzene⟩—COO—⟨benzene⟩—COO—CH($CF_3$)*—$C_6H_{13}$

TABLE 1-continued

Structural Formula

No. 4

(R) $C_{10}H_{21}$—⬡—⬡—COO—⬡(F)—COO—CH(CF$_3$)*—$C_8H_{17}$

No. 5

(R) $C_8H_{17}$—O—⬡—⬡—COO—⬡—COO—CH(CF$_3$)*—$C_6H_{13}$

No. 6

(R) $C_{10}H_{21}$—O—⬡—⬡(F)—COO—⬡(F)—COO—CH(CF$_3$)*—$C_8H_{17}$

TABLE 2

| Composition | Composite Ratios | |
|---|---|---|
| A | Compound No. 1 | 50 wt % |
|   | Compound No. 2 | 50 wt % |
| B | Compound No. 3 | 50 wt % |
|   | Compound No. 4 | 50 wt % |
| C | Compound No. 5 | 50 wt % |
|   | Compound No. 6 | 50 wt % |
| D | Composition A | 33 wt % |
|   | Composition B | 33 wt % |
|   | Composition C | 33 wt % |

TABLE 3

Phase Transition Temperatures (0° C.)

| | C | | $S_{CA}$* | | $S_C$ | | $S_A$ | | I |
|---|---|---|---|---|---|---|---|---|---|
| Composition A | — | 48.4 | — | 100.7 | — | 102.8 | — | 107.3 | — |
| Composition B | — | — | — | 55.4 | — | — | — | 56.3 | — |
| Composition C | — | 46.3 | — | 103.8 | — | — | — | 113.5 | — |
| Composition D | — | — | — | 81.1 | — | 82.1 | — | 93.5 | — |

TABLE 4

Structural Formula

No. 7

(R) $C_{10}H_{21}$—COO—⬡—⬡—COO—⬡—COO—CH(CF$_3$)*—$C_6H_{13}$

No. 8

(R) $C_8H_{17}$—COO—⬡—⬡—COO—⬡(F)—COO—CH(CF$_3$)*—$C_6H_{13}$

TABLE 5

| Composition | Composite Ratios | |
|---|---|---|
| E | Compound No. 7 | 50 wt % |
|   | Compound No. 8 | 50 wt % |
| F | Composition A | 33 wt % |
|   | Composition B | 33 wt % |
|   | Composition E | 33 wt % |

TABLE 6

Phase Transition Temperatures (0° C.)

| | C | | $S_{CA}$* | | $S_C$ | | $S_A$ | | I |
|---|---|---|---|---|---|---|---|---|---|
| Composition E | — | 60.9 | — | 87.3 | — | — | — | 98.5 | — |
| Composition F | — | — | — | — | — | 83.9 | — | 85.1 | — | 97.3 | — |

TABLE 7

| Composition | Composite Ratios | |
| --- | --- | --- |
| G | Composition A | 25 wt % |
|   | Composition B | 25 wt % |
|   | Composition C | 25 wt % |
|   | Composition D | 25 wt % |

TABLE 8

| | Phase Transition Temperatures (0° C.) | | | | | | |
| --- | --- | --- | --- | --- | --- | --- | --- |
|  | C |  | $S_{CA}*$ |  | $S_C$ | $S_A$ | I |
| Composition G | — | — | — | 88.5 | — | — | 102.3 | — |

Example 4

Liquid crystal compositions H, I, J and K having the compositions indicated in Table 10 were prepared using compounds no. 9 through 12 shown in Table 9.

H: Liquid crystal composition composed entirely of the antiferroelectric liquid crystal compounds represented by general formula (1)

I: Liquid crystal composition composed entirely of the antiferroelectric liquid crystal compounds represented by general formula (5)

J,K: Liquid crystal composition composed of the antiferroelectric liquid crystal compounds represented by general formulas (1) and (5).

The liquid crystal compositions were each injected into a cell in which two sheets of glass were superimposed while maintaining a gap of 2 μm, said sheets of glass having transparent electrodes and a polyimide aligning film arranged on their surfaces and on which aligning treatment was performed by rubbing. Following injection, the cell was heated to a temperature at which the liquid crystal composition changes to an isotropic liquid followed by cooling to room temperature at the rate of 2° C./min to obtain antiferroelectric liquid crystal elements.

A chopping wave of 1 Hz and ±25 V/μm was applied to this element after which the threshold voltage was determined by measuring the transmitted light intensity under a crossed nicol. Threshold voltage was defined as the voltage at which the transmission factor of the rise of the double hysteresis curve exceeds 90% as shown in FIG. 1.

The threshold voltages of compositions A, B, C and D at 50° C. were 25.9 V, 21.7 V, 18.5 V and 19.2 V, respectively.

The lower the threshold voltage the easier it is to drive the element as a display element. In consideration of the durability of the driving IC in particular, it is preferable that the threshold voltage be less than 25 V. Since the threshold voltage of composition H composed entirely of the antiferroelectric liquid crystal compound represented by general formula (1) is over 25 V, it has little practical application as is.

Next, although tilt angle, which has a significant effect on display characteristics, is typically referred to in antiferroelectric liquid crystal as the angle formed by molecules relative to the direction of normal of the molecular layer in a ferroelectric phase formed by electrical field induction, since it is difficult to measure this angle precisely, the inventors defined and measured tilt angle as the angle formed by a polarizer with the optical axis when a voltage greater than or equal to the threshold voltage is applied (completely bright state).

The tilt angles of compositions H, I, J and K were 26.2°, 29.4°, 25,1° and 25.8°.

The closer the tilt angle is to 45°, the more preferable the element for driving as a display element. In consideration of the required specifications of display characteristics in particular, it is preferable that the tilt angle be at least 25°. Composition H composed entirely of the antiferroelectric liquid crystal compounds represented by general formula (1), composition I composed entirely of the antiferroelectric liquid crystal compounds represented by general formula (5), and compositions J and K composed of the antiferroelectric liquid crystal compounds represented by general formulas (1) and (5) all exhibited favorable characteristics.

In addition, the phase series of antiferroelectric liquid crystal compositions H, I, J and K are shown in Table 11. Since the temperature range of the $S_{CA}*$ phase limits the working temperature range in the case of using as a display element, a wide temperature range is preferable. In consideration of the environment in which display elements are used in particular, it is preferable that the upper limit temperature of the $S_{CA}*$ phase be at least 65° C. Since the upper limit of composition I is 55.4° C., it has little practical application as is.

However, compositions J and K according to the present invention have threshold voltages of 18.5 V and 19.2 V, tilt angles of 25.1° and 25.8°, and $S_{CA}*$ phase upper limit temperatures of 76.5° C. and 67.1° C., respectively, thus exhibiting values that allow them to be used practically.

Moreover, the response time of the ferroelectric liquid crystal display element was measured based on the definition shown in FIGS. 2A and 2B by applying a voltage of electrical field strength ±50 V. The response time of compositions J and K at 50° C. was 8.3 and 9.0 μs, respectively, thus exhibiting favorable characteristics.

TABLE 9

Structural Formula

No. 9

(R) $C_{10}H_{21}$—O—⟨ring⟩—⟨ring with F⟩—COO—⟨ring⟩—COO—CH*(CH$_3$)—C$_6$H$_{13}$

TABLE 9-continued

Structural Formula

No. 10

(R) C₁₁H₂₃—⟨phenyl⟩—⟨phenyl⟩—COO—⟨phenyl-F⟩—COO—CH(CH₃)*—C₆H₁₃

No. 11

(R) C₁₀H₂₁—⟨phenyl⟩—⟨phenyl⟩—COO—⟨phenyl⟩—COO—CH(CF₃)*—C₆H₁₃

No. 12

(R) C₁₀H₂₁—⟨phenyl⟩—⟨phenyl⟩—COO—⟨phenyl-F⟩—COO—CH(CF₃)*—C₈H₁₇

TABLE 10

| Composition | Composite Ratios | |
|---|---|---|
| H | Compound No. 9 | 50 wt % |
|   | Compound No. 10 | 50 wt % |
| I | Compound No. 11 | 50 wt % |
|   | Compound No. 12 | 50 wt % |
| J | Compound No. 9 | 50 wt % |
|   | Compound No. 11 | 50 wt % |
| K | Composition H | 50 wt % |
|   | Composition I | 50 wt % |

TABLE 11

Phase Transition Temperatures (0° C.)

| | C | | $S_{CA}^*$ | | $S_C$ | | $S_A$ | | I |
|---|---|---|---|---|---|---|---|---|---|
| Composition H | — | — | — | 85.5 | — | 91.0 | — | 107.3 | — |
| Composition I | — | — | — | 55.4 | — | — | — | 56.3 | — |
| Composition J | — | — | — | 76.5 | — | 81.1 | — | 100.1 | — |
| Composition K | — | — | — | 67.1 | — | 71.5 | — | 86.9 | — |

The present invention has a sufficiently wide liquid crystal temperature range, a low driving voltage and exhibits favorable display characteristics.

The AFLC composition described in claims 7 through 8 is an AFLC composition in which current parameters have been improved (liquid crystal temperature range, threshold voltage, display performance). The threshold voltage of this AFLC composition is particularly good. In addition, although the AFLC composition described in claims 1 through 6 is also an AFLC composition in which current parameters have been improved (liquid crystal temperature range, threshold voltage, display performance), this AFLC composition has particularly good liquid crystal temperature range and display performance.

What is claimed is:

1. An antiferroelectric liquid crystal composition consisting essentially of the antiferroelectric liquid crystal compounds represented by general formulas (1), (2) and (3):

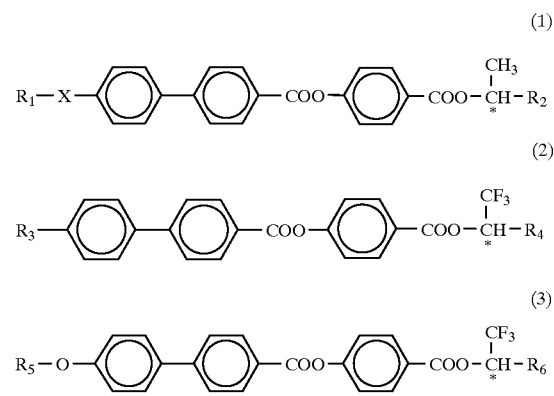

wherein, $R_1$, $R_3$ and $R_5$ are alkyl groups having 7–13 carbon atoms, $R_2$, $R_4$ and $R_6$ are alkyl groups having 4–8 carbon atoms, any of the four hydrogen atoms in each of the phenyl groups of formulas (1) through (3) may be substituted with a halogen atom such as F, Cl or Br, or a $CH_3$ group, and X indicates —O— or —.

2. An antiferroelectric liquid crystal composition as set forth in claim 1 wherein the antiferroelectric liquid crystal compound represented by said general formula (1) is composed of at least one type of compound of the group consisting of compounds indicated by general formula (1-1) through (1-10) below:

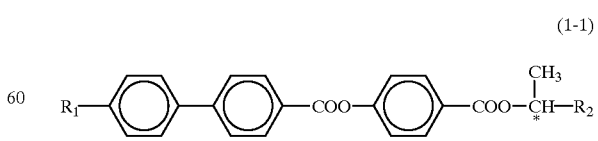

wherein, $R_1$ is selected from alkyl groups having 8, 9, 10, 11 or 12 carbon atoms, and $R_2$ is selected from alkyl groups having 4, 5, 6 or 8 carbon atoms;

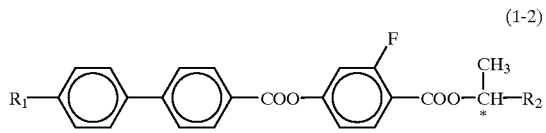
(1-2)

wherein, $R_1$ is selected from alkyl groups having 8, 9, 10, 11 or 12 carbon atoms, and $R_2$ is selected from alkyl groups having 4, 5, 6 or 8 carbon atoms;

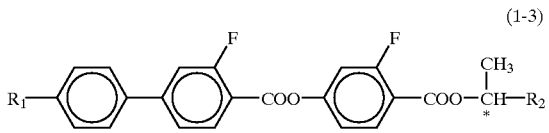
(1-3)

wherein, $R_1$ is selected from alkyl groups having 8, 9, 10, 11 or 12 carbon atoms, and $R_2$ is selected from alkyl groups having 4, 5, 6 or 8 carbon atoms;

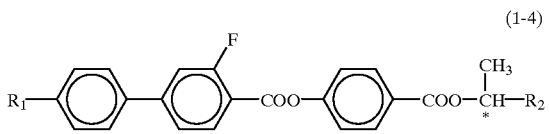
(1-4)

wherein, $R_1$ is selected from alkyl groups having 8, 9, 10, 11 or 12 carbon atoms, and $R_2$ is selected from alkyl groups having 4, 5, 6 or 8 carbon atoms;

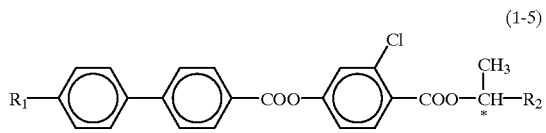
(1-5)

wherein, $R_1$ is selected from alkyl groups having 8, 9, 10, 11 or 12 carbon atoms, and $R_2$ is selected from alkyl groups having 4, 5, 6 or 8 carbon atoms;

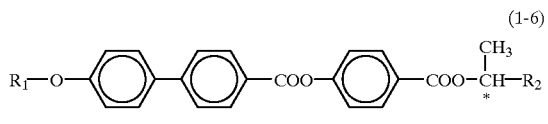
(1-6)

wherein, $R_1$ is selected from alkyl groups having 8, 9, 10, 11 or 12 carbon atoms, and $R_2$ is selected from alkyl groups having 4, 5, 6 or 8 carbon atoms;

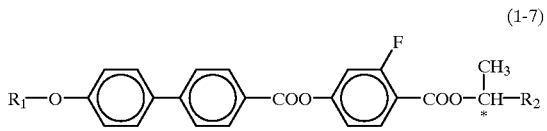
(1-7)

wherein, $R_1$ is selected from alkyl groups having 8, 9, 10, 11 or 12 carbon atoms, and $R_2$ is selected from alkyl groups having 4, 5, 6 or 8 carbon atoms;

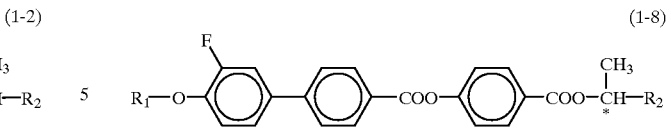
(1-8)

wherein, $R_1$ is selected from alkyl groups having 8, 9, 10, 11 or 12 carbon atoms, and $R_2$ is selected from alkyl groups having 4, 5, 6 or 8 carbon atoms;

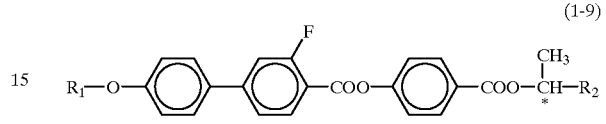
(1-9)

wherein, $R_1$ is selected from alkyl groups having 8, 9, 10, 11 or 12 carbon atoms, and $R_2$ is selected from alkyl groups having 4, 5, 6 or 8 carbon atoms;

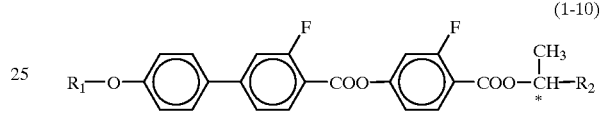
(1-10)

wherein, $R_1$ is selected from alkyl groups having 8, 9, 10, 11 or 12 carbon atoms), and $R_2$ is selected from alkyl groups having 4, 5, 6 or 8 carbon atoms;

the antiferroelectric liquid crystal compound represented by said general formula (2) is composed of at least one type of compound selected from the group consisting of compounds indicated by the general formulas (2-1) through (2-4) below:

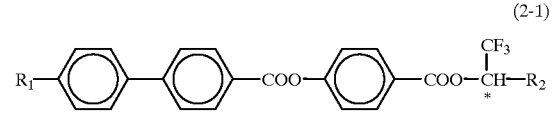
(2-1)

wherein, $R_1$ is selected from alkyl groups having 8, 9, 10, 11 or 12 carbon atoms, and $R_2$ is selected from alkyl groups having 4, 5, 6 or 8 carbon atoms;

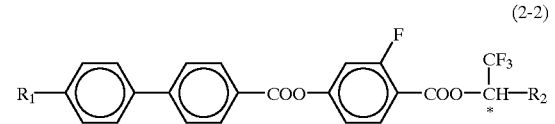
(2-2)

wherein, $R_1$ is selected from alkyl groups having 8, 9, 10, 11 or 12 carbon atoms, and $R_2$ is selected from alkyl groups having 4, 5, 6 or 8 carbon atoms;

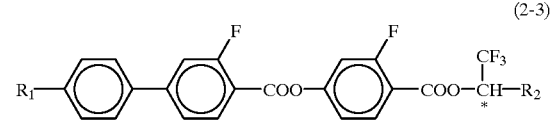
(2-3)

wherein, $R_1$ is selected from alkyl groups having 8, 9, 10, 11 or 12 carbon atoms, and $R_2$ is selected from alkyl groups having 4, 5, 6 or 8 carbon atoms;

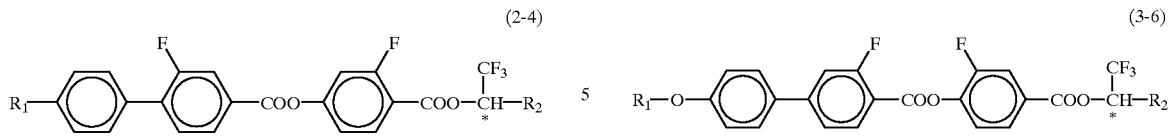
(2-4)

wherein, $R_1$ is selected from alkyl groups having 8, 9, 10, 11 or 12 carbon atoms, and $R_2$ is selected from alkyl groups having 4, 5, 6 or 8 carbon atoms; and, the antiferroelectric liquid crystal compound represented by said general formula (3) is composed of at least one type of compound selected from the group consisting of the compounds indicated by general formulas (3-1) through (3-6) below:

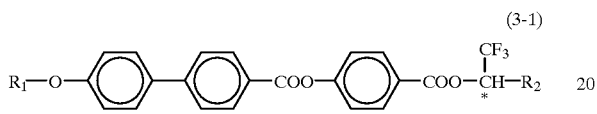
(3-1)

wherein, $R_1$ is selected from alkyl groups having 8, 9, 10, 11 or 12 carbon atoms, and $R_2$ is selected from alkyl groups having 4, 5, 6 or 8 carbon atoms;

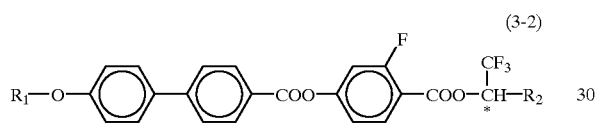
(3-2)

wherein, $R_1$ is selected from alkyl groups having 8, 9, 10, 11 or 12 carbon atoms, and $R_2$ is selected from alkyl groups having 4, 5, 6 or 8 carbon atoms;

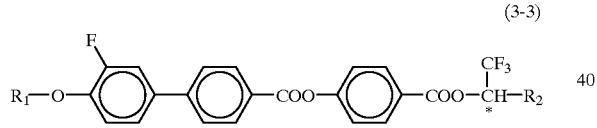
(3-3)

wherein, $R_1$ is selected from alkyl groups having 8, 9, 10, 11 or 12 carbon atoms, and $R_2$ is selected from alkyl groups having 4, 5, 6 or 8 carbon atoms;

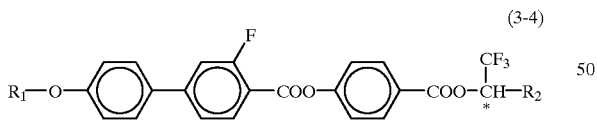
(3-4)

wherein, $R_1$ is selected from alkyl groups having 8, 9, 10, 11 or 12 carbon atoms, and $R_2$ is selected from alkyl groups having 4, 5, 6 or 8 carbon atoms;

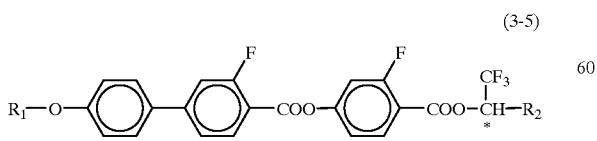
(3-5)

wherein, $R_1$ is selected from alkyl groups having 8, 9, 10, 11 or 12 carbon atoms, and $R_2$ is selected from alkyl groups having 4, 5, 6 or 8 carbon atoms;

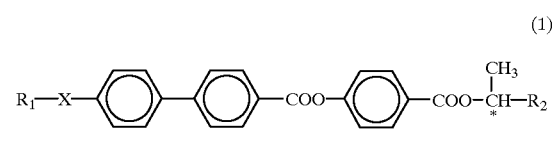
(3-6)

wherein, $R_1$ is selected from alkyl groups having 8, 9, 10, 11 or 12 carbon atoms, and $R_2$ is selected from alkyl groups having 4, 5, 6 or 8 carbon atoms.

3. An antiferroelectric liquid crystal composition consisting essentially of the antiferroelectric liquid crystal compounds represented by general formulas (1), (2) and (4):

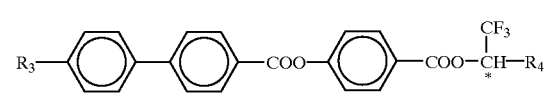
(1)

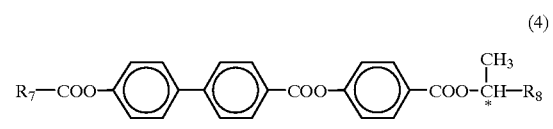
(2)

(4)

wherein, R1, R3 and R7 are alkyl groups having 7–13 carbon atoms, R2, R4 and R6 are alkyl groups having 4–8 carbon atoms, any of the four hydrogen atoms in each of the phenyl groups of formulas (1), (2) and (4) may be substituted with a halogen atom such as F, Cl or Br, or a $CH_3$ group, and X indicates —O— or —.

4. An antiferroelectric liquid crystal composition as set forth in claim 3 wherein the antiferroelectric liquid crystal compound represented by said general formula (1) is composed of at lest one type of compound selected from the group consisting of compounds indicated by general formula (1-1) through (1-10) below:

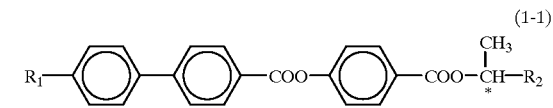
(1-1)

wherein, $R_1$ is selected from alkyl groups having 8, 9, 10, 11 or 12 carbon atoms, and $R_2$ is selected from alkyl groups having 4, 5, 6 or 8 carbon atoms;

(1-2)

wherein, $R_1$ is selected from alkyl groups having 8, 9, 10, 11 or 12 carbon atoms, and $R_2$ is selected from alkyl groups having 4, 5, 6 or 8 carbon atoms;

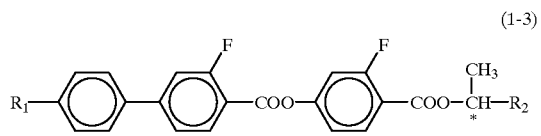
(1-3)

wherein, $R_1$ is selected from alkyl groups having 8, 9, 10, 11 or 12 carbon atoms, and $R_2$ is selected from alkyl groups having 4, 5, 6 or 8 carbon atoms;

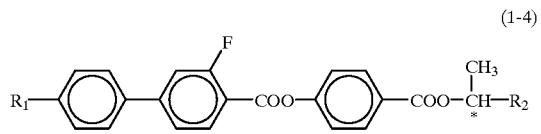
(1-4)

wherein, $R_1$ is selected from alkyl groups having 8, 9, 10, 11 or 12 carbon atoms, and $R_2$ is selected from alkyl groups having 4, 5, 6 or 8 carbon atoms;

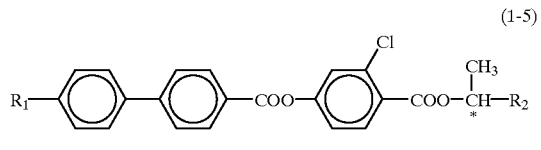
(1-5)

wherein, $R_1$ is selected from alkyl groups having 8, 9, 10, 11 or 12 carbon atoms, and $R_2$ is selected from alkyl groups having 4, 5, 6 or 8 carbon atoms;

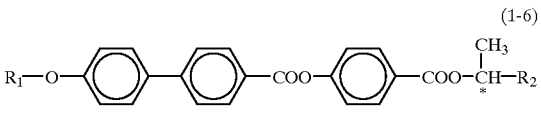
(1-6)

wherein, $R_1$ is selected from alkyl groups having 8, 9, 10, 11 or 12 carbon atoms, and $R_2$ is selected from alkyl groups having 4, 5, 6 or 8 carbon atoms;

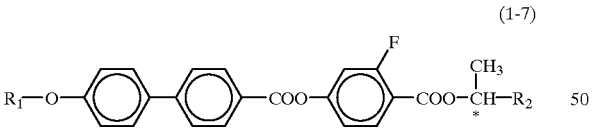
(1-7)

wherein, $R_1$ is selected from alkyl groups having 8, 9, 10, 11 or 12 carbon atoms, and $R_2$ is selected from alkyl groups having 4, 5, 6 or 8 carbon atoms;

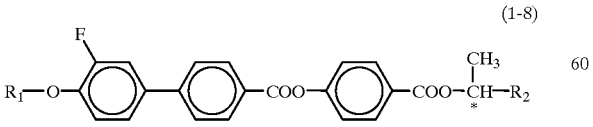
(1-8)

wherein, $R_1$ is selected from alkyl groups having 8, 9, 10, 11 or 12 carbon atoms, and $R_2$ is selected from alkyl groups having 4, 5, 6 or 8 carbon atoms;

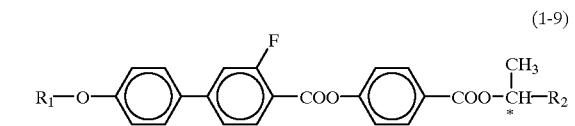
(1-9)

wherein, $R_1$ is selected from alkyl groups having 8, 9, 10, 11 or 12 carbon atoms, and $R_2$ is selected from alkyl groups having 4, 5, 6 or 8 carbon atoms;

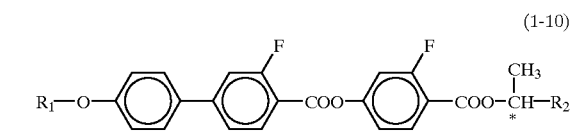
(1-10)

wherein, $R_1$ is selected from alkyl groups having 8, 9, 10, 11 or 12 carbon atoms, and $R_2$ is selected from alkyl groups having 4, 5, 6 or 8 carbon atoms;

the antiferroelectric liquid crystal compound represented by said general formula (2) is composed of at least one type of compound selected from the group consisting of compounds indicated by the general formulas (2-1) through (2-4) below:

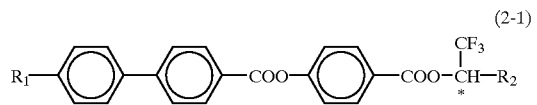
(2-1)

wherein, $R_1$ is selected from alkyl groups having 8, 9, 10, 11 or 12 carbon atoms, and $R_2$ is selected from alkyl groups having 4, 5, 6 or 8 carbon atoms;

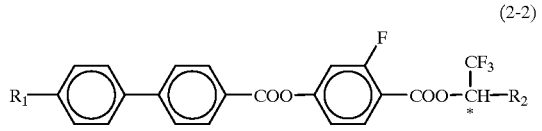
(2-2)

wherein, $R_1$ is selected from alkyl groups having 8, 9, 10, 11 or 12 carbon atoms, and $R_2$ is selected from alkyl groups having 4, 5, 6 or 8 carbon atoms;

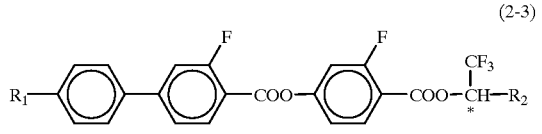
(2-3)

wherein, $R_1$ is selected from alkyl groups having 8, 9, 10, 11 or 12 carbon atoms, and $R_2$ is selected from alkyl groups having 4, 5, 6 or 8 carbon atoms;

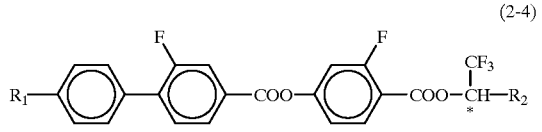
(2-4)

wherein, $R_1$ is selected from alkyl groups having 8, 9, 10, 11 or 12 carbon atoms, and $R_2$ is selected from alkyl groups having 4, 5, 6 or 8 carbon atoms; and the antiferroelectric liquid crystal compound represented by said general formula (4) is composed of at least one type of compound selected from the group consisting of compounds indicated by general formulas (4-1) through (4-4) below:

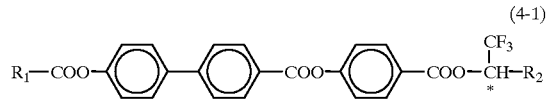
(4-1)

wherein, $R_1$ is selected from alkyl groups having 8, 9, 10, 11 or 12 carbon atoms, and $R_2$ is selected from alkyl groups having 4, 5, 6 or 8 carbon atoms;

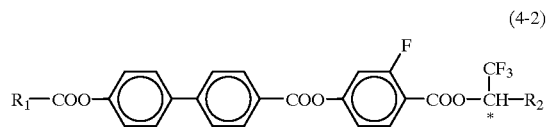
(4-2)

wherein, $R_1$ is selected from alkyl groups having 8, 9, 10, 11 or 12 carbon atoms, and $R_2$ is selected from alkyl groups having 4, 5, 6 or 8 carbon atoms;

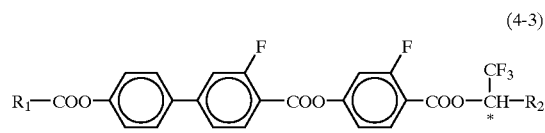
(4-3)

wherein, $R_1$ is selected from alkyl groups having 8, 9, 10, 11 or 12 carbon atoms, and $R_2$ is selected from alkyl groups having 4, 5, 6 or 8 carbon atoms;

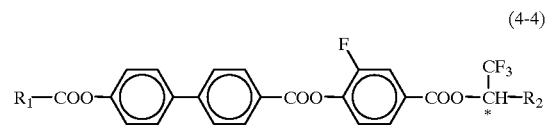
(4-4)

wherein, $R_1$ is selected from alkyl groups having 8, 9, 10, 11 or 12 carbon atoms, and $R_2$ is selected from alkyl groups having 4, 5, 6 or 8 carbon atoms.

5. An antiferroelectric liquid crystal composition consisting essentially of the antiferroelectric liquid crystal compounds represented by general formulas (1), (2), (3) and (4):

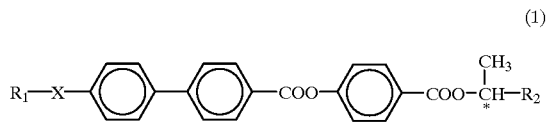
(1)

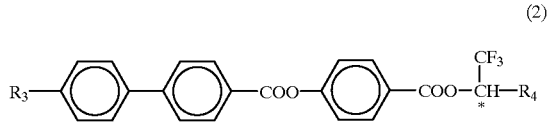
(2)

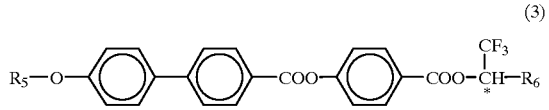
(3)

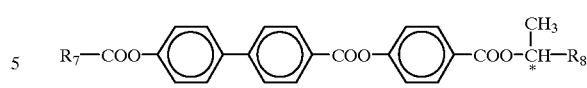
(4)

wherein, $R_1$, $R_3$, $R_5$ and $R_7$ are alkyl groups having 7–13 carbon atoms, $R_2$, $R_4$, $R_6$ and $R_8$ are alkyl groups having 4–8 carbon atoms, any of the four hydrogen atoms in each of the phenyl groups of formulas (1) through (4) may be substituted with a halogen atom such as F, Cl or Br, or a $CH_3$ group, and X indicates —O— or —.

6. An antiferroelectric liquid crystal composition as set forth in claim 5 wherein the antiferroelectric liquid crystal compound represented by said general formula (1) is composed of at least one type of compound selected from the group consisting of compounds indicated by general formula (1-1) through (1-10) below:

(1-1)

wherein, $R_1$ is selected from alkyl groups having 8, 9, 10, 11 or 12 carbon atoms, and $R_2$ is selected from alkyl groups having 4, 5, 6 or 8 carbon atoms;

(1-2)

wherein, $R_1$ is selected from alkyl groups having 8, 9, 10, 11 or 12 carbon atoru, and $R_2$ is selected from alkyl groups having 4, 5, 6 or 8 carbon atoms;

(1-3)

wherein, $R_1$ is selected from alkyl groups having 8, 9, 10, 11 or 12 carbon atoms, and $R_2$ is selected from alkyl groups having 4, 5, 6 or 8 carbon atoms;

(1-4)

wherein, $R_1$ is selected from alkyl groups having 8, 9, 10, 11 or 12 carbon atoms, and $R_2$ is selected from alkyl groups having 4, 5, 6 or 8 carbon atoms;

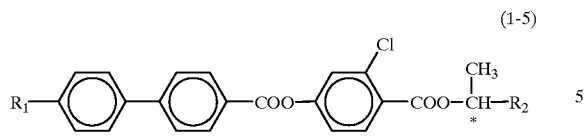
(1-5)

wherein, $R_1$ is selected from alkyl groups having 8, 9, 10, 11 or 12 carbon atoms, and $R_2$ is selected from alkyl groups having 4, 5, 6 or 8 carbon atoms;

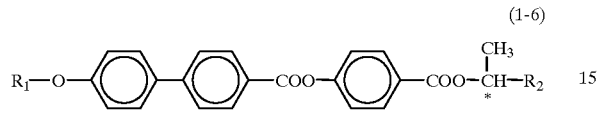
(1-6)

wherein, $R_1$ is selected from alkyl groups having 8, 9, 10, 11 or 12 carbon atoms, and $R_2$ is selected from alkyl groups having 4, 5, 6 or 8 carbon atoms;

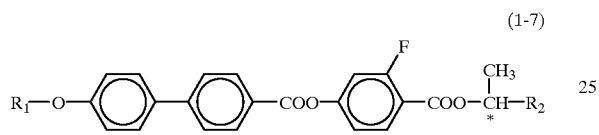
(1-7)

wherein, $R_1$ is selected from alkyl groups having 8, 9, 10, 11 or 12 carbon atoms, and $R_2$ is selected from alkyl groups having 4, 5, 6 or 8 carbon atoms;

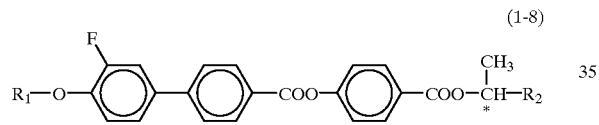
(1-8)

wherein, $R_1$ is selected from alkyl groups having 8, 9, 10, 11 or 12 carbon atoms, and $R_2$ is selected from alkyl groups having 4, 5, 6 or 8 carbon atoms;

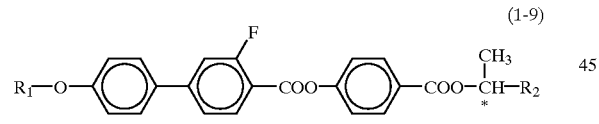
(1-9)

wherein, $R_1$ is selected from alkyl groups having 8, 9, 10, 11 or 12 carbon atoms, and $R_2$ is selected from alkyl groups having 4, 5, 6 or 8 carbon atoms;

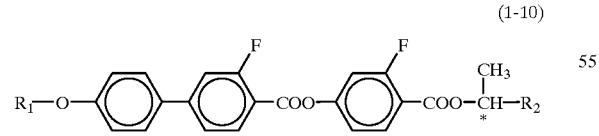
(1-10)

wherein, $R_1$ is selected from alkyl groups having 8, 9, 10, 11 or 12 carbon atoms, and $R_2$ is selected from alkyl groups having 4, 5, 6 or 8 carbon atoms;

the antiferroelectric liquid crystal compound represented by said general formula (2) is composed of at least one type of compound selected from the group consisting of compounds indicated by the general formulas (2-1) through (2-4) below:

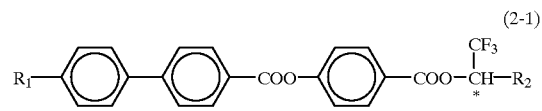
(2-1)

wherein, $R_1$ is selected from alkyl groups having 8, 9, 10, 11 or 12 carbon atoms, and $R_2$ is selected from alkyl groups having 4, 5, 6 or 8 carbon atoms;

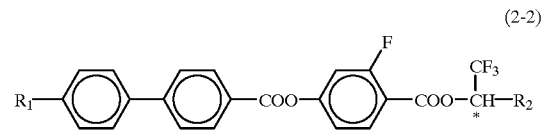
(2-2)

wherein, $R_1$ is selected from alkyl groups having 8, 9, 10, 11 or 12 carbon atoms, and $R_2$ is selected from alkyl groups having 4, 5, 6 or 8 carbon atoms;

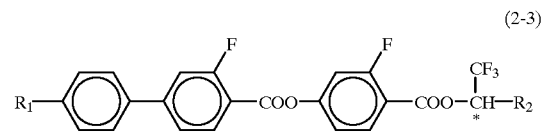
(2-3)

wherein, $R_1$ is selected from alkyl groups having 8, 9, 10, 11 or 12 carbon atoms, and $R_2$ is selected from alkyl groups having 4, 5, 6 or 8 carbon atoms;

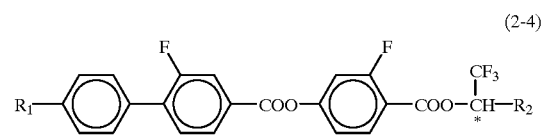
(2-4)

wherein, $R_1$ is selected from alkyl groups having 8, 9, 10, 11 or 12 carbon atoms, and $R_2$ is selected froma alkyl groups having 4, 5, 6 or 8 carbon atoms;

the antiferroelectric liquid crystal compound represented by said general formula (3) is composed of at least one type of compound selected from the group consisting of the compounds indicated by general formulas (3-1) through (3-6) below:

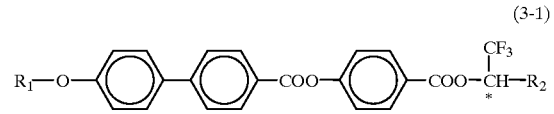
(3-1)

wherein, $R_1$ is selected from alkyl groups having 8, 9, 10, 11 or 12 carbon atoms, and $R_2$ is selected from alkyl groups having 4, 5, 6 or 8 carbon atoms;

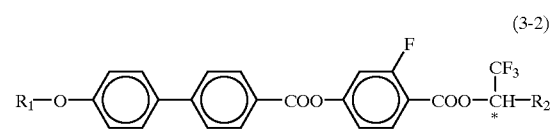
(3-2)

wherein, $R_1$ is selected from alkyl groups having 8, 9, 10, 11 or 12 carbon atoms, and $R_2$ is selected from alkyl groups having 4, 5, 6 or 8 carbon atoms;

(3-3)
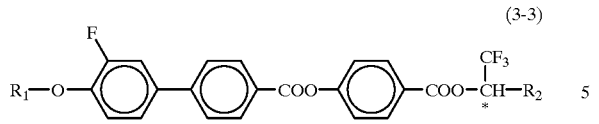

wherein, $R_1$ is selected from alkyl groups having 8, 9, 10, 11 or 12 carbon atoms, and $R_2$ is selected from alkyl groups having 4, 5, 6 or 8 carbon atoms;

(3-4)
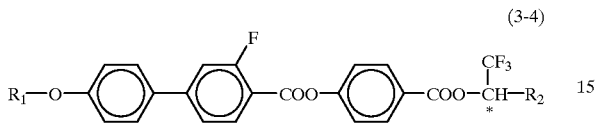

wherein, $R_1$ is selected from alkyl groups having 8, 9, 10, 11 or 12 carbon atoms, and $R_2$ is selected from alkyl groups having 4, 5, 6 or 8 carbon atoms;

(3-5)
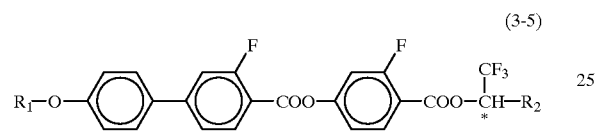

wherein, $R_1$ is selected from alkyl groups having 8, 9, 10, 11 or 12 carbon atoms, and $R_2$ is selected from alkyl groups having 4, 5, 6 or 8 carbon atoms;

(3-6)
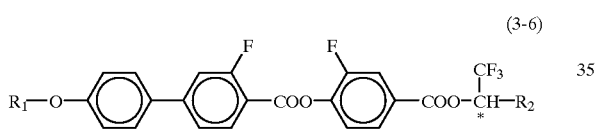

wherein, $R_1$ is selected from alkyl groups having 8, 9, 10, 11 or 12 carbon atoms, and $R_2$ is selected from alkyl groups having 4, 5, 6 or 8 carbon atoms; and
the antiferroelectric liquid crystal compound represented by said general formula (4) is composed of at least one type of compound selected from the group consisting of compounds indicated by general formulas (4-1) through (4-4) below:

(4-1)
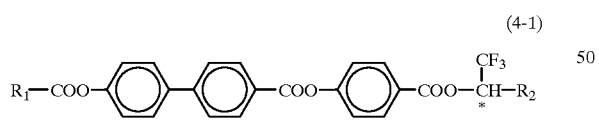

wherein, $R_1$ is selected from alkyl groups having 8, 9, 10, 11 or 12 carbon atoms, and $R_2$ is selected from alkyl groups having 4, 5, 6 or 8 carbon atoms;

(4-2)
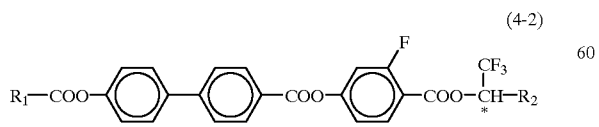

wherein, $R_1$ is selected from alkyl groups having 8, 9, 10, 11 or 12 carbon atoms, and $R_2$ is selected from alkyl groups having 4, 5, 6 or 8 carbon atoms;

(4-3)
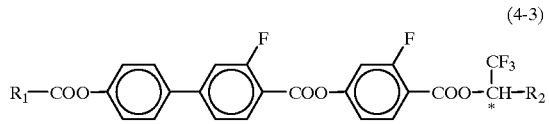

wherein, $R_1$ is selected from alkyl groups having 8, 9, 10, 11 or 12 carbon atoms, and $R_2$ is selected from alkyl groups having 4, 5, 6 or 8 carbon atoms;

(4-4)
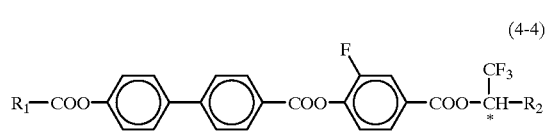

wherein, $R_1$ is selected from alkyl groups having 8, 9, 10, 11 or 12 carbon atoms, and $R_2$ is selected from alkyl groups having 4, 5, 6 or 8 carbon atoms.

7. An antiferroelectric liquid crystal composition consisting essentially of the antiferroelectric liquid crystal compound represented by general formula (1) and the antiferroelectric liquid crystal compound represented by general formula (5):

(1)
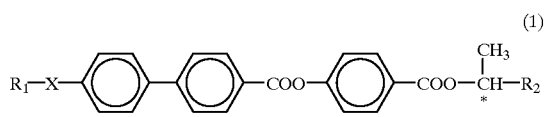

(5)
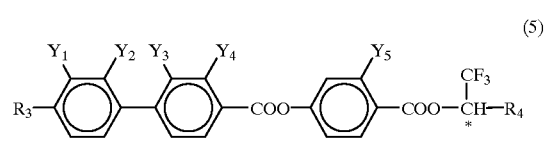

wherein, $R_1$ and $R_3$ are alkyl groups having 7–13 carbon atoms, $R_2$ and $R_4$ are alkyl groups having 4–8 carbon atoms, any of the four hydrogen atoms in each of the phenyl groups of formulas (1) and (5) may be substituted with a halogen atom such as F, Cl or Br, or a $CH_3$ group; provided that, in the case all 12 of the three groups of four hydrogen atoms each in the phenyl groups of general formula (1) are hydrogen atoms, at least one of $Y_1$ through $Y_5$ in general formula (5) is substituted with a halogen atom such as F, Cl or Br, or a $CH_3$ group; and, X indicates —O— or —.

8. An antiferroelectric liquid crystal composition as set forth in claim 7 wherein the antiferroelectric liquid crystal compound represented by said general formula (1) is composed of at least one type of compound selected from the group consisting of compounds indicated by general formula (1-1) through (1-10) below:

(1-1)
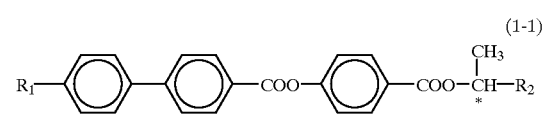

wherein, $R_1$ is selected from alkyl groups having 8, 9, 10, 11 or 12 carbon atoms, and $R_2$ is selected from alkyl groups having 4, 5, 6 or 8 carbon atoms;

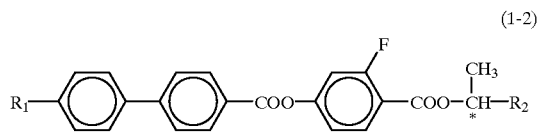
(1-2)

wherein, $R_1$ is selected from alkyl groups having 8, 9, 10, 11 or 12 carbon atoms, and $R_2$ is selected from alkyl groups having 4, 5, 6 or 8 carbon atoms;

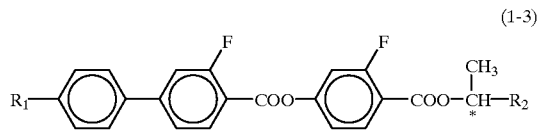
(1-3)

wherein, $R_1$ is selected from alkyl groups having 8, 9, 10, 11 or 12 carbon atoms, and $R_2$ is selected from alkyl groups having 4, 5, 6 or 8 carbon atoms;

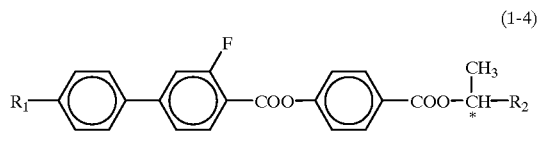
(1-4)

wherein, $R_1$ is selected from alkyl groups having 8, 9, 10, 11 or 12 carbon atoms, and $R_2$ is selected from alkyl groups having 4, 5, 6 or 8 carbon atoms;

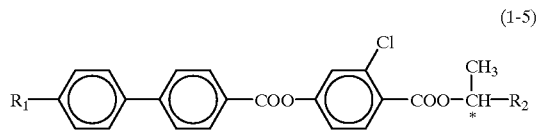
(1-5)

wherein, $R_1$ is selected from alkyl groups having 8, 9, 10, 11 or 12 carbon atoms, and $R_2$ is selected from alkyl groups having 4, 5, 6 or 8 carbon atoms;

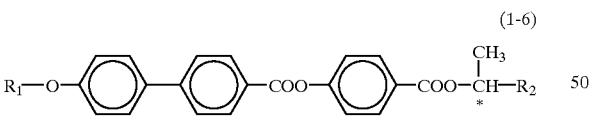
(1-6)

wherein, $R_1$ is selected from alkyl groups having 8, 9, 10, 11 or 12 carbon atoms, and $R_2$ is selected from alkyl groups having 4, 5, 6 or 8 carbon atoms;

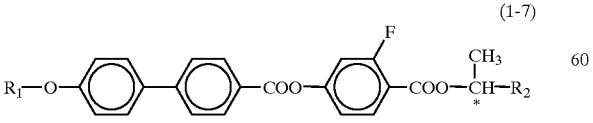
(1-7)

wherein, $R_1$ is selected from alkyl groups having 8, 9, 10, 11 or 12 carbon atoms, and $R_2$ is selected from alkyl groups having 4, 5, 6 or 8 carbon atoms;

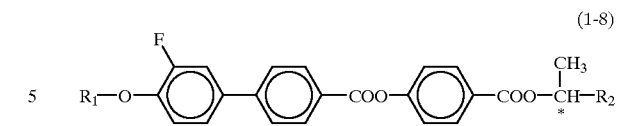
(1-8)

wherein, $R_1$ is selected from alkyl groups having 8, 9, 10, 11 or 12 carbon atoms, and $R_2$ is selected from alkyl groups having 4, 5, 6 or 8 carbon atoms;

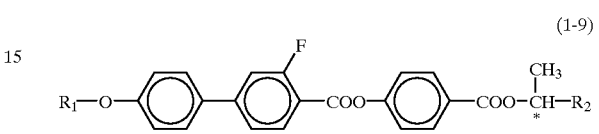
(1-9)

wherein, $R_1$ is selected from alkyl groups having 8, 9, 10, 11 or 12 carbon atoms, and $R_2$ is selected from alkyl groups having 4, 5, 6 or 8 carbon atoms;

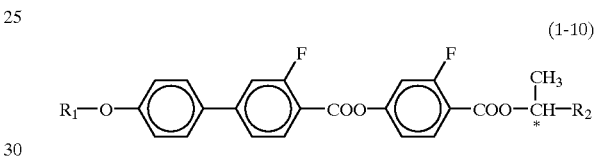
(1-10)

wherein, $R_1$ is selected from alkyl groups having 8, 9, 10, 11 or 12 carbon atoms, and $R_2$ is selected from alkyl groups having 4, 5, 6 or 8 carbon atoms; and, the antiferroelectric liquid crystal compound represented by said general formula (5) is composed of at least one type of compound selected from the group consisting of compounds indicated by general formula (5-1) through (5-4) below; provided that, in the case of containing the compound indicated by the general formulae (1-1) and (1-6), at least one type of (5-2) through (5-4) is contained:

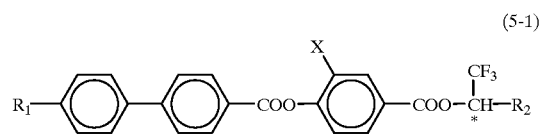
(5-1)

wherein, $R_1$ is selected from alkyl groups having 8, 9, 10, 11 or 12 carbon atoms, and $R_2$ is selected from alkyl groups having 4, 5, 6 or 8 carbon atoms;

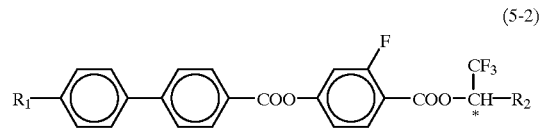
(5-2)

wherein, $R_1$ is selected from alkyl groups having 8, 9, 10, 11 or 12 carbon atoms, and $R_2$ is selected from alkyl groups having 4, 5, 6 or 8 carbon atoms;

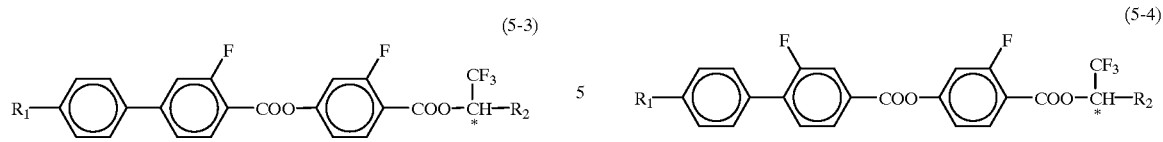
wherein, $R_1$ is selected from alkyl groups having 8, 9, 10, 11 or 12 carbon atoms, and $R_2$ is selected from alkyl groups having 4, 5, 6 or 8 carbon atoms;
wherein, $R_1$ is selected from alkyl groups having 8, 9, 10, 11 or 12 carbon atoms, and $R_2$ is selected from alkyl groups having 4, 5, 6 or 8 carbon atoms.
* * * * *